United States Patent [19]

Gladstone

[11] Patent Number: 4,914,505
[45] Date of Patent: Apr. 3, 1990

[54] HIGH DEFINITION TELEVISION SYSTEM

[76] Inventor: Ernest Gladstone, 721 Ave. O, Brooklyn, N.Y. 11230

[21] Appl. No.: 354,751

[22] Filed: May 22, 1989

[51] Int. Cl.⁴ ............................................. H04N 11/00
[52] U.S. Cl. ......................................... 358/2; 358/90; 350/3.77
[58] Field of Search ..................... 358/2, 90; 350/3.71, 350/3.72, 3.79

[56] References Cited

U.S. PATENT DOCUMENTS 3,544,711 12/1970 De Bitetto ............................ 358/2
3,900,884 8/1975 St. John ................................ 358/2

Primary Examiner—Howard W. Britton
Assistant Examiner—Kim Yen Vu
Attorney, Agent, or Firm—Kirschstein, Ottinger, Israel & Schiffmiller

[57] ABSTRACT

A high definition television system enables an object to be holographically recorded on a signal plate of an iconoscope to generate a multitude of picture signals which are, in turn, processed to form a multitude of screen lines on a display screen. A viewer will see a three-dimensional image of the object being televised. The high definition television transmission may be subcast onto extant television broadcast bands without interfering with the standard television.

11 Claims, 3 Drawing Sheets

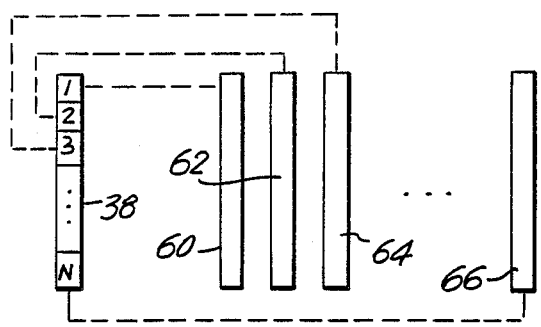
FIG.3
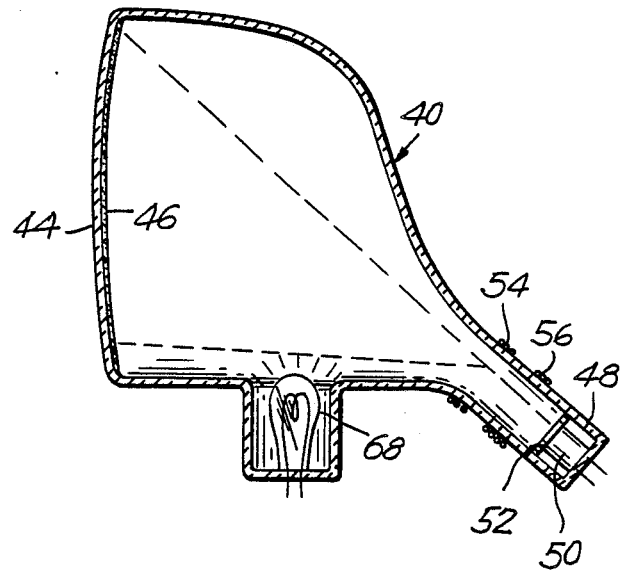
FIG.4
FIG.5
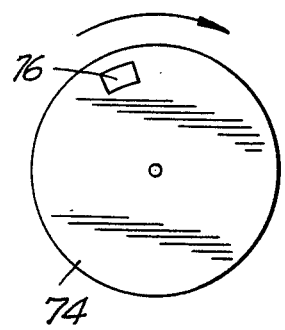
FIG.6
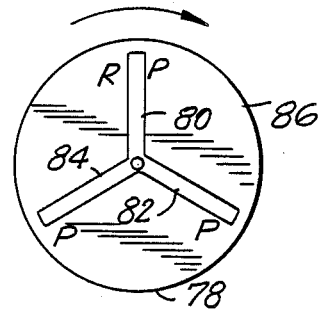

HIGH DEFINITION TELEVISION SYSTEM

BACKGROUND OF THE INVENTION

1. Field of the Invention

This invention generally relates to a high definition television system and, more particularly, to a transmitter and a receiver capable of recording and displaying respectively a hologram of an object to be televised.

2. Description of Related Art

Television cameras for converting an optical image into a sequence of electrical signals for transmission to a television picture tube for subsequent conversion to an image being televised have long been known for both black-and-white and color pictures. To obtain a reasonably good picture, the picture was sub-divided into a number of horizontal lines, e.g. 625, and each line contained at least several hundred, if not thousands, of individually identifiable picture elements. Since more lines would result in a picture of greater resolution than that currently available, recently proposed systems for producing a high definition picture have concentrated on increasing the number of lines to at least 1000 and more. However, such high definition systems require a great deal of information to be transmitted over the presently available television broadcast bands and, hence, would crowd the existing bands and, in any event, are incompatible with standard television equipment.

SUMMARY OF THE INVENTION

1. Objects of the Invention

It is a general object of this invention to advance the state of the art of television systems.

it is another object of this invention to transmit and display a high definition television picture using holographic techniques.

A further object of this invention is to transmit a hologram of an object to be televised over the currently available television broadcast bands without intefering with standard television broadcast transmissions.

Still another object of this invention is to simultaneously transmit standard television broadcast transmissions and high definition television broadcast transmissions in accordance with this invention in the same broadcast band.

Yet another object of this invention is to permit many more broadcast channels to exist in a given frequency band enabling television broadcasters to compete with cable broadcasters.

A still further object of this invention is to enable a viewer to see a holographic image in three dimensions and in color, and with an increased resolution compared to images currently televised on conventional television sets.

2. Features of the Invention

In keeping with these objects, and others which will become apparent hereinafter, one feature of this invention resides, briefly stated, in a high definition television system comprising a transmitter sub-system and a receiver sub-system. The transmitter sub-system comprises means for generating a reference beam of coherent light from a coherent light source, and for reflecting from an object to be televised an object beam of coherent light from the same source. These two beams impinge and form an interference pattern on a signal plate of an electronic analyzer, e.g. an iconoscope, thereby creating a recorded hologram of the object.

One scan line of the recorded hologram is electronically scanned in a linear direction, and includes a multitude of picture elements or pixels. Each line and each pixel contains all the information of the entire inteference pattern of the object possessed by the entire hologram. An electrical picture signal is generated in response to each scanned pixel. A succession of picture signals, each corresponding to a respective pixel, is transmitted to the receiver sub-system.

The receiver sub-system includes a display screen having a front viewing side and a back side. The transmitted picture signals are successively received and, in response thereto, a multitude of screen lines are arranged closely adjacent one another on the screen along a row. Each screen line corresponds to a respective received picture signal. All of the screen lines together constitute a display hologram of the object. The display hologram of the object is back-lit at the back side of the display screen to enable a viewer at the front viewing side to see the three-dimensional image of the object that was televised.

In the preferred embodiment, the picture signals for the single scan line are transmitted and received within 1/10,000 of a second. Successive hologram "stills" are transmitted every 1/30 of a second or so. For visual permanence, a repeater is utilized to repeat the display hologram. By utilizing only 1/10,000 of a second of the existing broadcast band, it is possible to sub-cast a high definition television picture transmission according to this invention, together with a standard television broadcast transmission in the same broadcast band without mutual interference. Many more broadcast channels can exist in a given frequency band, since this invention only requires 1/10,000 of a second to transmit all of the information pertaining to a particular hologram. A viewer is thus enabled to view a three-dimensional image in a residential or a threatre setting and in color, and with increased resolution to those pictures currently available.

The novel features which are considered as characteristic of the invention are set forth in particular in the appended claims. The invention itself, however, both as to its construction and its method of operation, together with additional objects and advantages thereof, will best be understood from the following description of specific embodiments when read in connection with the accompanying drawings.

BRIEF DESCRIPTION OF THE DRAWINGS

FIG. 3 is a diagram depicting the operation of the system;

FIG. 4 is a sectional view of the picture tube of FIG. 2;

FIG. 5 is a top plan view of a repeater; and

FIG. 6 is an end view of the laser interrupter-shutter used in FIG. 1.

DETAILED DESCRIPTION OF THE PREFERRED EMBODIMENT

Figure 1:
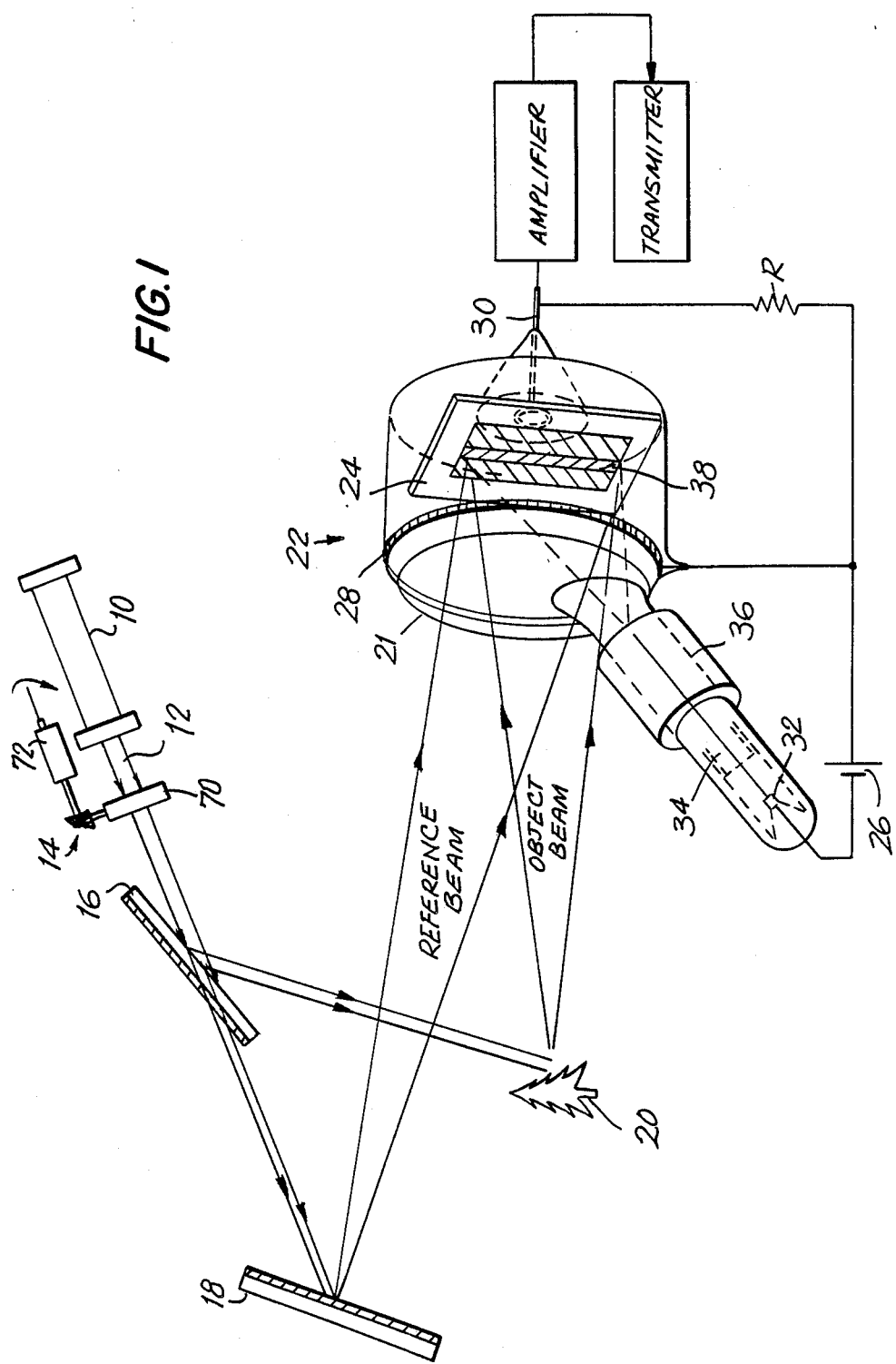
FIG. 1 is a diagrammatic view of a transmitter sub-system of a high definition television system according to this invention.

Referring now to FIG. 1, a coherent light source 10, such as a gas or solid-state laser, propagates a coherent light beam 12 along an optical path past a shutter assembly 14 whose operation is described in detail below, to an apertured splitter mirror 16. A portion of the laser beam 12 passes through the aperture in the mirror 16 and impinges on a folding mirror 18 operative for scattering the impinging light and generating a so-called reference beam. Another portion of the laser beam 12 reflects off the splitter mirror 16, and is directed to an object 20 to be televised. The object 20 scatters the laser beam impinging thereon and generates a so-called object beam.

The object 20 is shown in FIG. 1, for ease of illustration, as a tree. It will be expressly understood that the object need not be inanimate or stationary, but can be any thing, place, person or animal, either stationary or mobile. The word "object" as used in this specification and in the following claims is intended to be construed in the broadest sense possible and includes virtually any person, animal, place or thing, mobile or stationary.

An electronic analyzer such as an iconoscope 22 has a signal plate 24 whose front face is covered with a multitude of tiny globules of silver, each treated during manufacture so that each globule has a surface of the oxides of silver and cesium. Those portions of the reference and object beams which enter an entrance pupil 21 and impinge on the signal plate form an interference pattern which is recorded thereon. The interference pattern constitutes a recorded hologram fully descriptive of the object 20.

The globular array on the signal plate acquires a positive electrical charge whose distribution matches the distribution of light in the interference pattern. A positive terminal of a battery 26 is connected to an annular anode 28 and, via a resistor R, to a signal electrode 30 which is electrically connected to the plate 24. A negative terminal of the battery 26 is connected to a cathode 32 operative for emitting a beam of electrons into the space bounded by the annular anode 28. An electric lens 34 of conventional construction focuses the electrons into a narrow beam. A magnetic coil 36 deflects the narrow beam over a scan line 38 which, in the preferred embodiment, extends linearly and vertically across the recorded hologram.

As best shown in FIG. 3, the scan line 38 is comprised of a number of picture elements or pixels 1, 2, 3 . . . N, where N is typically on the order of several thousand. The scan line 38, as well as each individual pixel, contains all the information about the object 20 possessed by the entire recorded hologram. It is well known that each and every part of a hologram contains all of the information that the whole hologram possesses so that any small part will display the entire object when viewed, except, of course, that the display of the object will appear grainier and have less resolution than the original. Thus, each pixel of the scan line of the recorded hologram will have exactly the same information as any other pixel.

When the narrow electron beam strikes the globules in pixel 1, those globules are discharged. The individual oxide coatings of the globules in pixel 1 act as one electrode of a capacitor, the other electrode of which is the signal plate 24. The signal plate is separated from the globules by a dielectric sheet, tyically mica. When the globules in pixel 1 are discharged, an electrical picture signal is generated. Analogously, as the narrow electron beam strikes the globules in the adjoining pixels 2 . . . N, a succession of picture signals are generated. The narrow electron beam, in a preferred embodiment, scans the single scan line 38 in about 1/10,000 of a second. The succession of picture signals may be broadcast by electromagnetic wave transmission through the air on a real time basis, or conducted by cable, or may be taped for subsequent broadcast.

Figure 2:
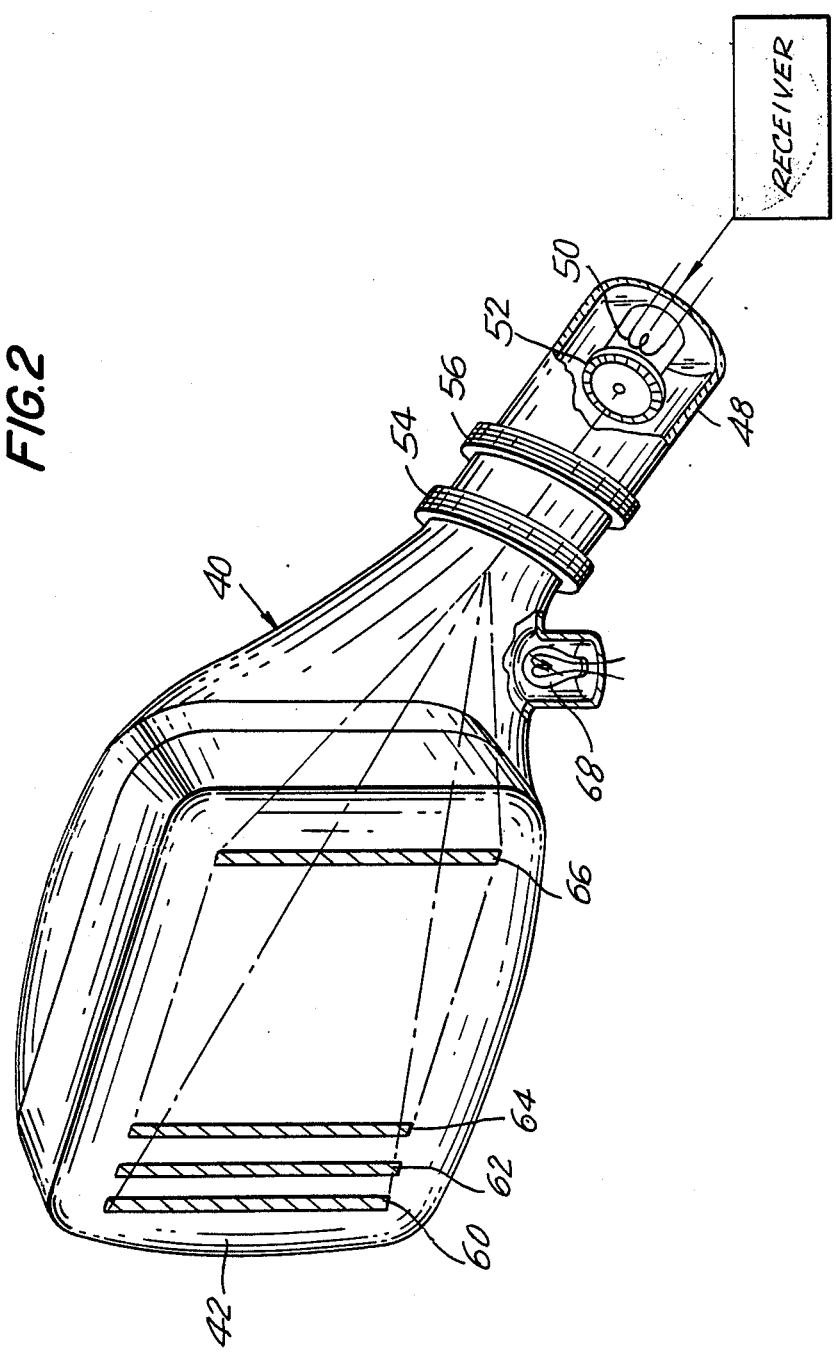
FIG. 2 is a diagrammatic view of a receiver sub-system of a high definition television system according to this invention.

A receiver sub-system shown in FIG. 2 receives the transmitted picture signals and includes a television picture tube, e.g. a modified cathode ray tube 40 having a generally planar display screen 42 which has a front viewing side 44 and a back side (see FIG. 4). The screen 42 has a peripheral edge delimiting the bounds of the viewing area. As shown in FIG. 4, the tube 40 has a downwardly sloping neck 48 situated at a lower elevation than a lower edge of the screen.

The tube 40 has an electrode gun comprising a hot cathode 50 which emits a stream of electrons through an annular space bounded by a ring-shaped anode 52. A magnetic lens 54 expands and spreads the stream into a generally flat fan shape. When the fan-shaped electron stream intersects the plane of the screen 42, a vertical screen line is formed. A magnetic deflecting coil 56 is used to form a multitude of such vertical screen lines, all arranged in a row, in a generally horizontal direction across the width of the screen in a direction generally perpendicular to the elongation of the screen lines.

To effect a better resolution of all the screen lines on the screen 42, it is preferred to choose the scan line 38 not to be a strictly vertical line centrally arranged on the signal plate 24 as shown in FIG. 1, but, instead, to choose an angled scan line. This can be conveniently obtained by simply turning the iconoscope through an angle of about 40° relative to the horizontal. At the same time, a potentiometer is electrically connected to the magnetic lens 54. The potentiometer is manually operated to "tune", i.e. to orient, the fan-shaped beam at an angle relative to the horizontal. This angle is optimally selected by a viewer to form the best display hologram comprised of all the angled screen lines.

Turning now to FIG. 3, as noted above, the single scan line 38 on the signal plate 24 is comprised of a multitude of pixels 1 . . . N, each pixel corresponding to a picture signal. The picture signal corresponding to pixel 1 is transmitted and received by the receiver sub-system 40 which, in turn, forms a screen line 60 on the screen. Analogously, the picture signals corresponding to pixels 2 . . . N are transmitted and received by the receiver sub-system 40 which, in turn, forms additional screen lines 62, 64, 66. The set of screen lines are parallel to one another and are arranged in a close adjacent relationship such that all of the screen lines together constitute a display hologram of the object.

The display screen advantageously includes a layer of electron-activatable material deposited on the back side of the screen in the path of the fan-shaped electron stream. This layer may be a phosphor or, in the preferred embodiment, a transparent film of material which turns opaque only when hit by electrons and which remains transparent when not impinged by electrons. A transparent film suitable for this purpose is currently used in the field of coated sunglasses.

In order to enable a viewer at the front viewing side of the receiver sub-system to see the three-dimensional image of the object being televised, an illuminator 68, e.g. a laser or an incandescent bulb, is operative for back-lighting the display hologram at the back side of the display screen. The viewer can now view a three-dimensional image of the object 20. The illuminator can be pulsed or be continuously on. As clearly shown in FIG. 4, the illuminator 68, as well as the neck 48 with its associated electromagnetic components 50, 52, 54, 56, are located at an elevation below that of the lower edge of the display screen, that is, out of the direct line of sight of a viewer so as not to be seen.

The receiver and transmitter sub-systems work in syncrhonism and, as described above, transmit and receive all the picture signals in the single scan line 38 in about 1/10,000 of a second. If the conventional standard television transmission lasts for about 1/30 of a second, it will be noted that the high definition television transmission according to this invention occupies an almost negligible part of that band. Thus, the high definition transmission can be sub-cast together with a standard television broadcast without having to crowd the existing band or having to enlarge the existing band. Many more channels can be assigned to the existing television broadcast band.

In order to record motion of an object without subjecting the viewer to an objectionable picture flicker, a hologram "still" of that motion is recorded every 1/30 of a second or so. To this end, the aforementioned shutter assembly 14 shown in FIG. 1 includes a shutter 70 positioned in the optical path and movable into and out of said path by a motor drive 72 approximately 30 times per second. The shutter is turned at about 1800 rpm.

As shown in FIG. 5, a shutter wheel 74 is turned at about 1800 rpm and is provided with an off-center window or slot 76 adjacent the periphery of the wheel. The laser beam 12 is directed at the window and passes therethrough every 1/30 of a second for a duration of about 1/10,000 of a second. The rotation of the wheel 74 is synchronized to the scanning of the scan line 38. For example, a photodetector anywhere in the optical path of the laser beam, e.g. on the folding mirror 18, can be energized by the impinging laser beam to generate a control signal to synchronize the wheel rotation and the scanning of the scan line 38.

Turning now to FIG. 4, a repeater 78 having three arms 80, 82, 84 is used to repeat each screen line a multitude of times per second in order to reduce objectionable flicker. Arm 80 carries a record (R) and play (P) head; each arm 82, 84 carries a single play (P) head. A drum 86 surrounds the arms.

In operation, as the arms turn, a first incoming received signal is recorded by the record head on the drum 86, The play head on arm 84 re-plays the first signal to the receiver sub-system, followed by the play head on arm 82 which also re-plays the first signal to the receiver sub-system, followed by the play head on arm 80 which further re-plays the first signal to the receiver sub-system. The arms are turned about 111 times every 1/30 of a second, resulting in a total number of repeated "stills" of about 333 times every 1/30 of a second. Thus, the first signal corresponding to, for example, screen line 60, has been repeated 333 times every 1/30 of a second.

The aforementioned repeating process is repeated for the next incoming received signal corresponding to, for example, screen line 62 and, in succession, for all successive screen lines. The resulting display hologram has a flicker-free appearance.

In the case where the object is a person, safety considerations dictate that he not be continuously exposed to laser light. These safety concerns are allayed by the fact that the laser beam impinges on the person for only about 30/10,000 of a second, each second, for a total impingement of about 18/100 of a second for each minute "on camera". Should this prove insufficient to allay safety concerns, then this invention also includes the possibility that the person or object can be recorded by conventional television cameras on a moving film and, thereupon, the moving film is recorded on a signal plate of an iconoscope using the holographic techniques described above.

It will be understood that each of the elements described above, or two or more together, also may find a useful application in other types of constructions differing from the types described above.

While the invention has been illustrated and described as embodied in a high definition television system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. A high definition television system, comprising:
    (a) means for generating a reference beam of coherent light from a coherent light source, and for reflecting from an object to be televised an object beam of coherent light from the source;
    (b) an electronic analyzer having a signal plate;
    (c) means for recording on the signal plate an interference pattern formed by impingement of the beams thereon, thereby producing a recorded hologram of the object;
    (d) means for electronically scanning a scan line extending linearly across the recorded hologram, said scan line being comprised of a multitude of pixels, each pixel containing all the information about the object possessed by the entire recorded hologram, said scanning means being further operative for electronically generating a multitude of electrical picture signals, each corresponding to a respective pixel;
    (e) transmitter means for successively transmitting said picture signals within a predetermined time period away from the signal plate;
    (f) a display screen having a front viewing side and a back side;
    (g) receiver means responsive to the transmitter means, and operative for successively receiving the transmitted picture signals within said predetermined time period, said receiver means including means for forming a multitude of screen lines in close adjacent relationship on the screen, each screen line corresponding to a respective transmitted picture signal, all of said screen lines together constituting a display hologram of the object; and
    (h) means for back-lighting the display hologram at the back side of the display screen to enable a viewer at the front viewing side to see the display hologram of the object being televised.

2. The high definition television system according to claim 1, wherein the electronic analyzer is an iconoscope, and wherein the scanning means includes means for generating a beam of electrons, means for focusing the beam of electrons into a linear electron beam, and means for deflecting the linear electron beam linearly across the scan line across the recorded hologram.

3. The high definitiion television system according to claim 1, wherein the receiver means includes a cathode ray tube having at least one electron gun for emitting a stream of electrons, and means for focusing the stream of electrons into a fan-shaped diverging electron stream; and wherein the display screen includes a layer of electron-activatable material deposited on the screen in the path of the diverging electron stream, each diverging electron stream forming one of said screen lines; and wherein the forming means includes means for deflecting the diverging electron stream to position the screen lines in a row across the display screen.

4. The high definition television system according to claim 3, wherein the display screen has a lower marginal edge delimiting a lower boundary of the display hologram and situated at a predetermined elevation; and wherein the electron gun, the focusing means and the forming means are situated on the tube at an elevation lower than said predetermined elevation.

5. The high definition television system according to claim 4, wherein the back-lighting means includes a light emitter situated at an elevation lower than said predetermined elevation, said emitter being an incandescent bulb.

6. The high definition television system according to claim 3, wherein the electron-activating material is normally light-transmissive and turns opaque when impinged by the stream of electrons.

7. The high definition television system according to claim 1, wherein the coherent light source is a laser operative for propagating a reference laser beam and an object laser beam; and further comprising safety means for limiting propagation of the beams to a minor fraction of a second.

8. The high definition television system according to claim 1, wherein the receiver means includes means for repeating each screen line a multitude of times on the display screen.

9. The high definition television system according to claim 1, wherein the transmitter means transmits the picture signals in a minor fraction of existing television broadcast bands.

10. A high definition television transmitter comprising:
(a) means for generating a reference beam of coherent light from a coherent light source, and for reflecting from an object to be televised an object beam of coherent light from the same source;
(b) an electron scanner having a signal plate;
(c) means for holographically recording on the signal plate an interference pattern formed by impingement of the beams thereon, thereby producing a recorded hologram of the object;
(d) means for electronically scanning one scan line extending linearly across the hologram, said one scan line being comprised of a multitude of pixels, each pixel containing all the information about the object possessed by the entire recorded hologram, said scanning means being further operative for electronically generating a multitude of electrical picture signals, each indicative of a respective pixel; and
(e) transmitter means for successively transmitting said picture signals within a predetermined time period away from the signal plate.

11. A high definition television receiver comprising:
a cathode ray tube including a display screen having a front viewing side and a back side, and a neck disposed below and rearwardly of the display screen;
an electron gun at the neck for emitting a stream of electrons;
means at the neck for focusing the stream of electrons into a linear electron screen;
a layer of electron-activatable material deposited on the display screen in the path of the linear electron stream to form a screen line on the display screen;
means for forming a multitude of screen lines in close adjacent relationship on the screen, all of the screen lines together constituting a hologram of an object to be viewed; and
means at the neck for back-lighting the screen at its back side to enable a viewer at the front viewing side to view the hologram of the object.

* * * * *